Patented May 6, 1952

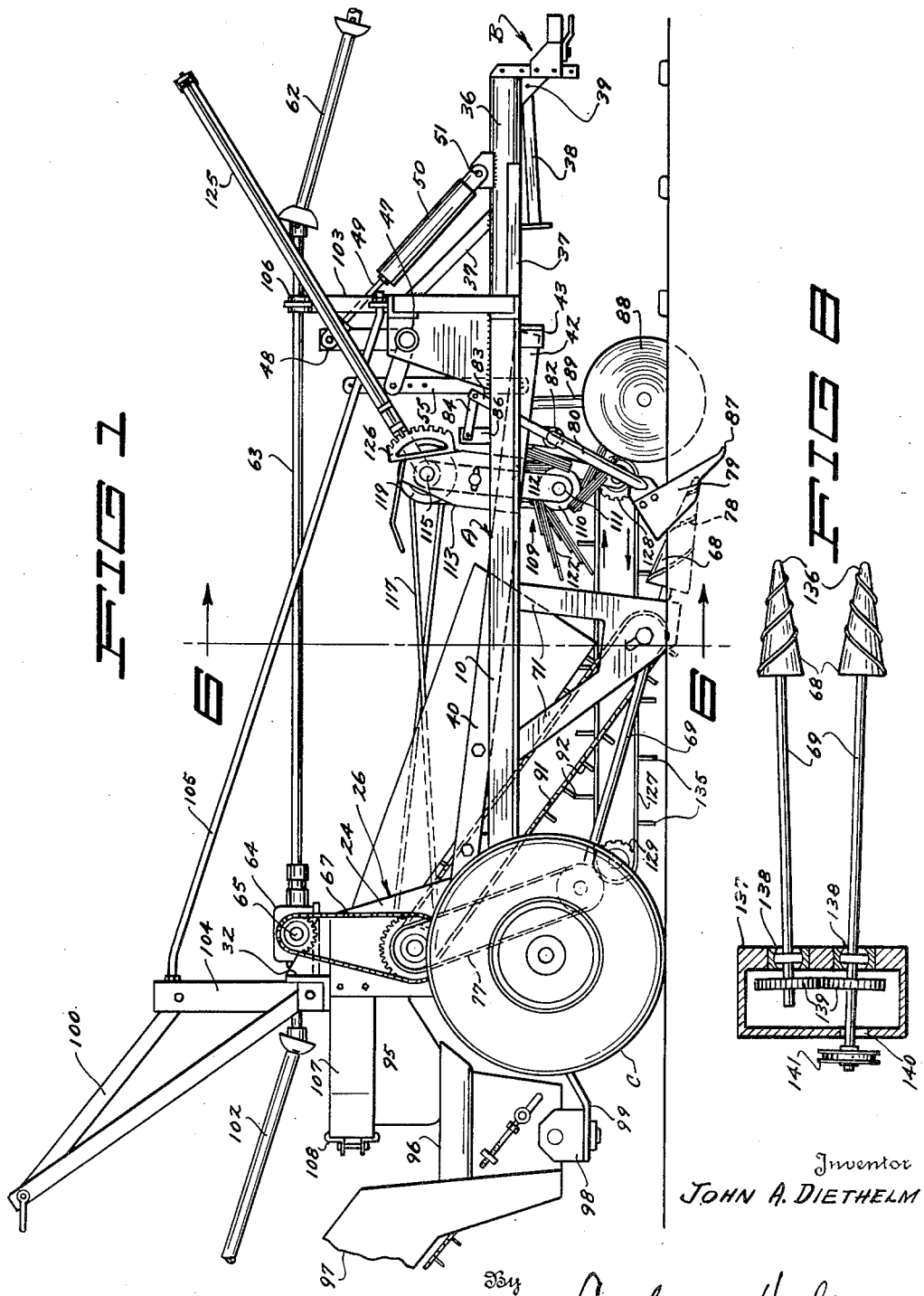

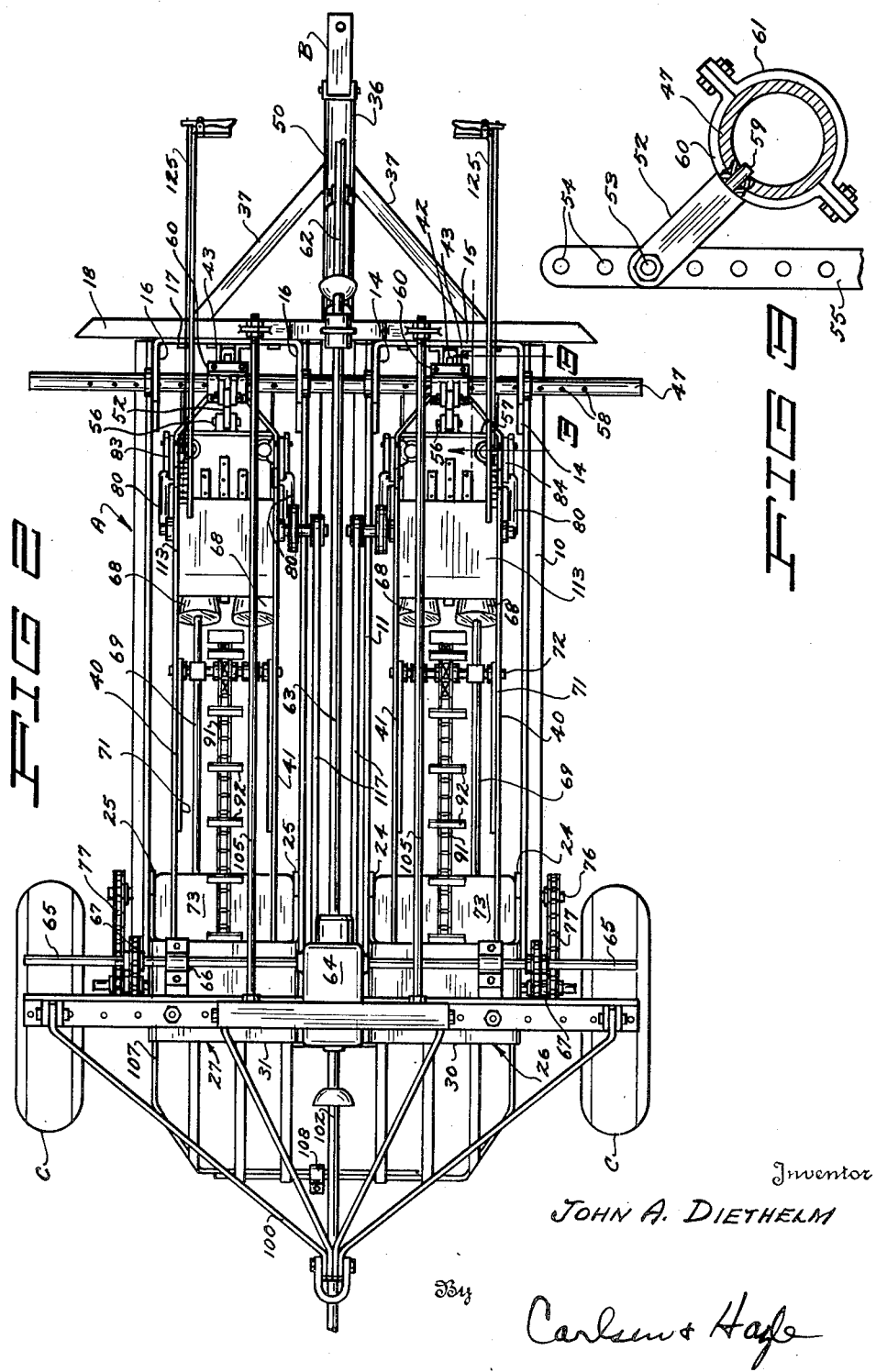

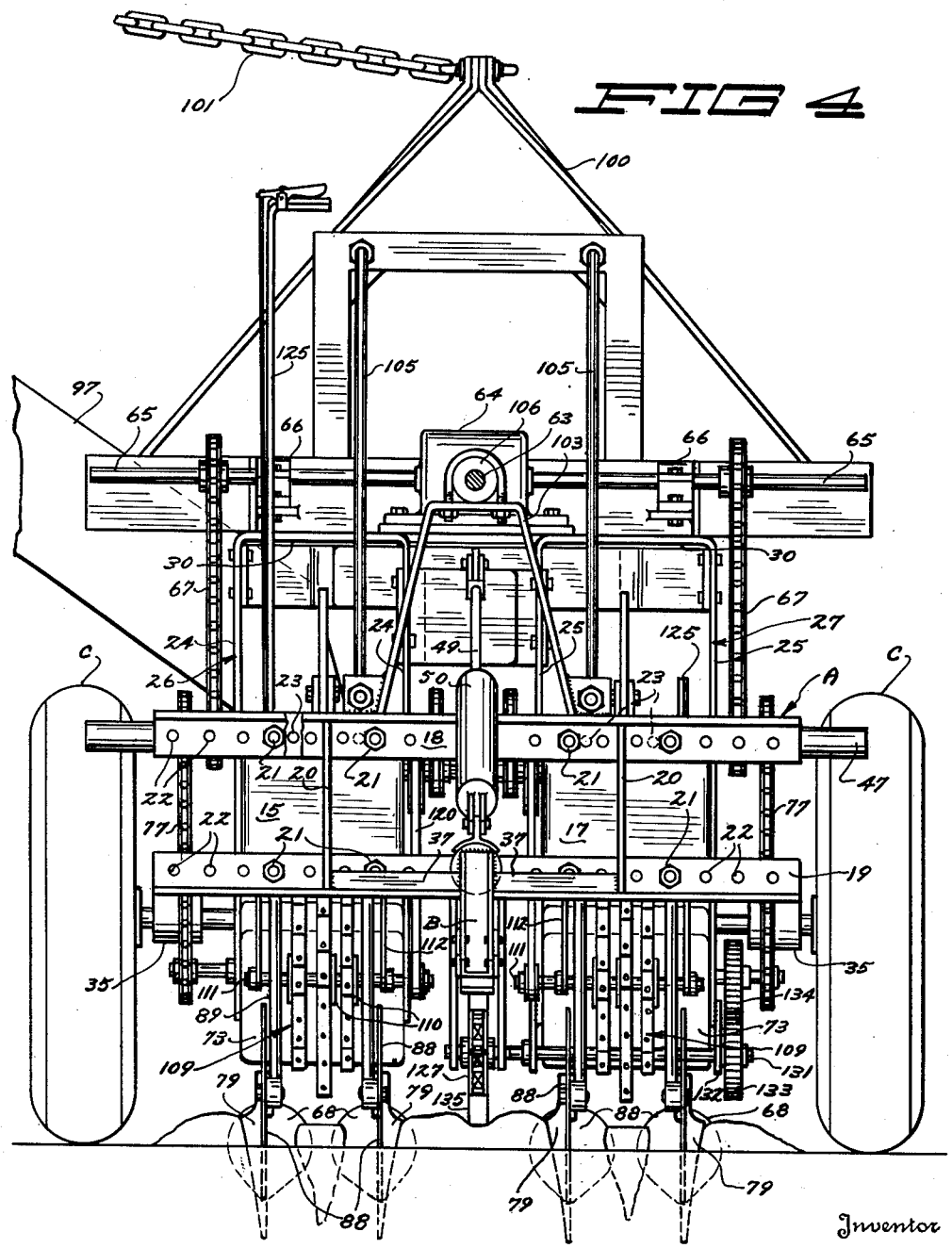

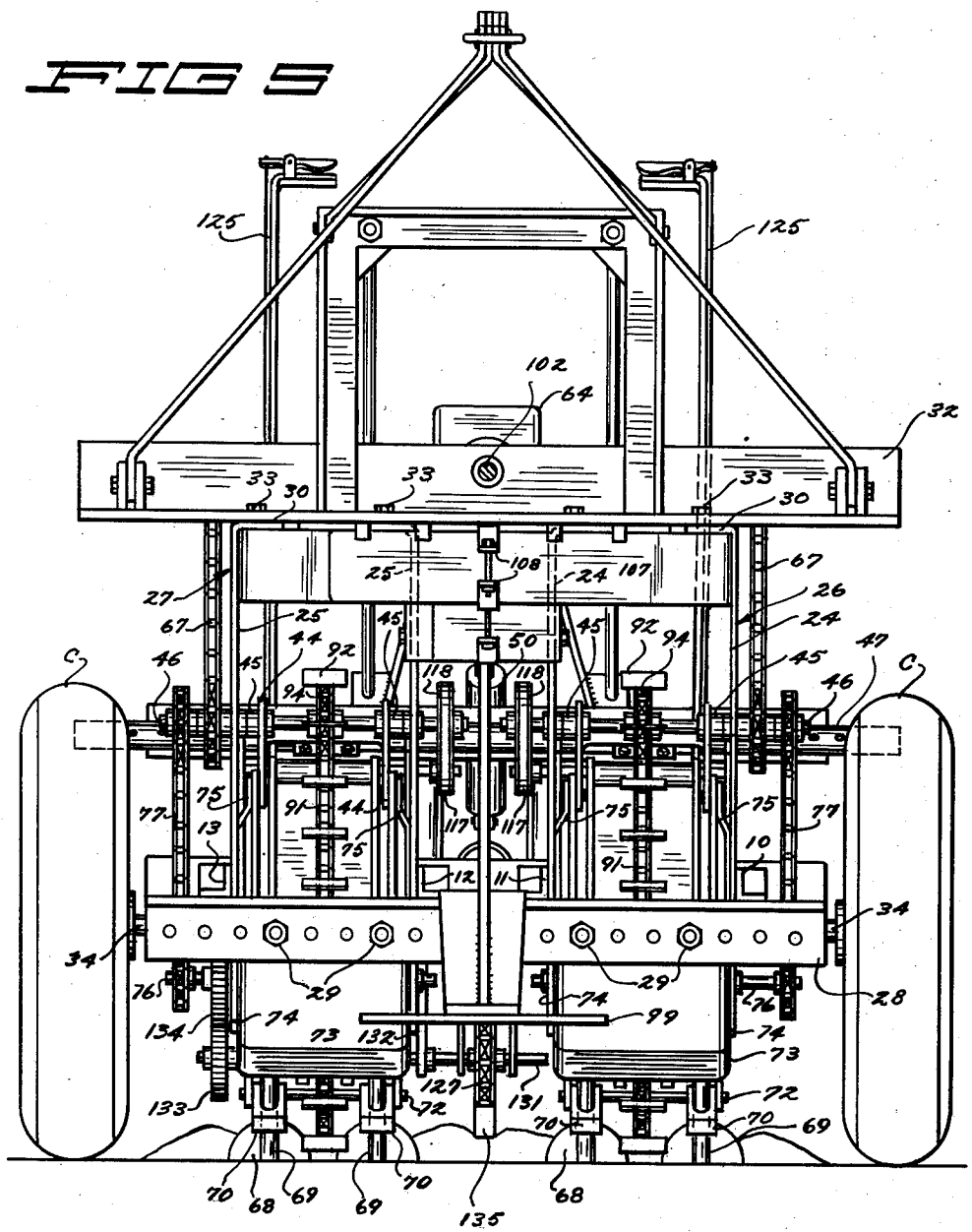

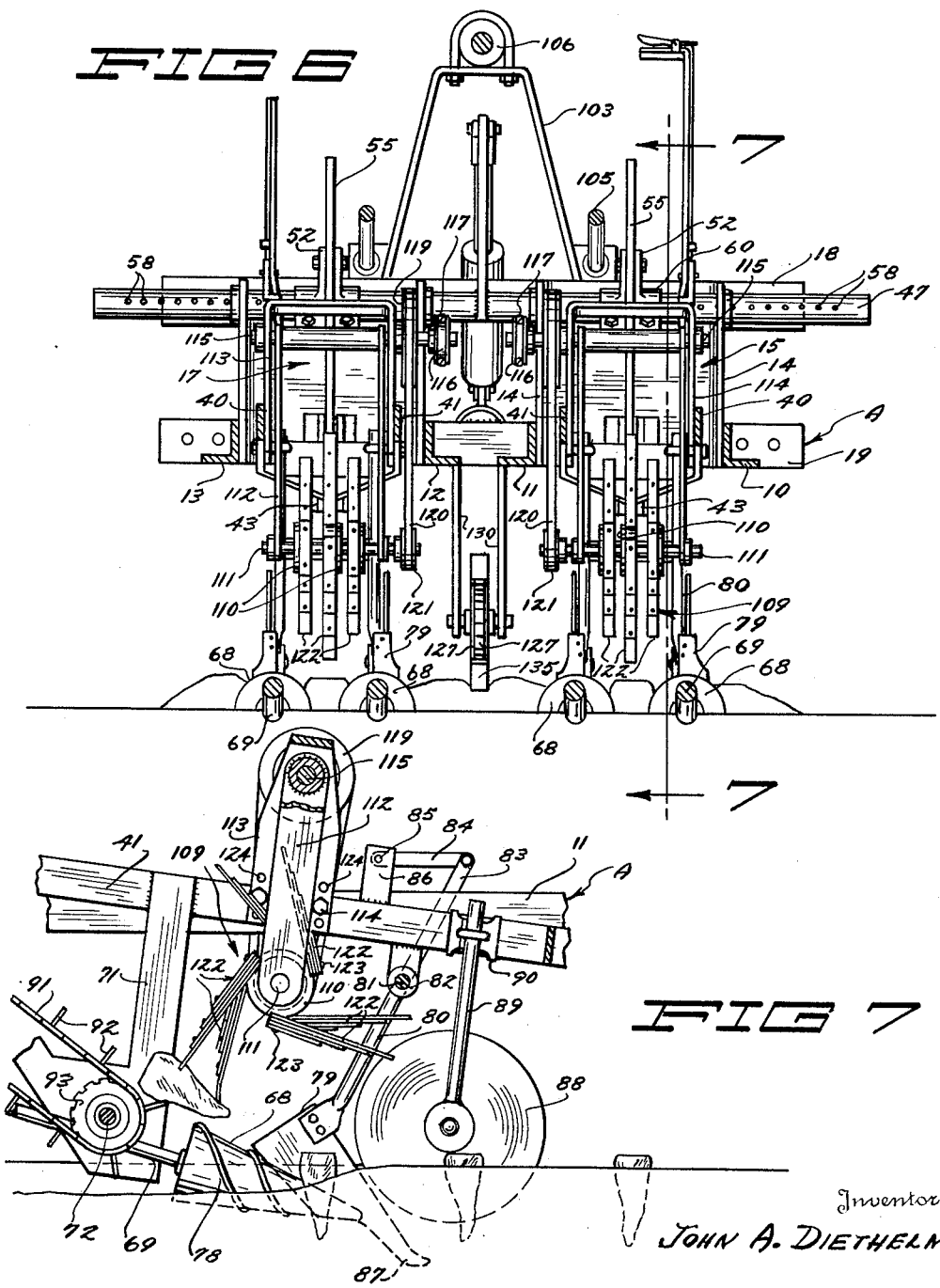

2,595,340

UNITED STATES PATENT OFFICE 2,595,340

BEET HARVESTER

John A. Diethelm, Victoria, Minn.

Application December 23, 1948, Serial No. 66,894

3 Claims. (Cl. 55—106)

My invention relates to improvements in machines for harvesting sugar beets.

The invention further relates to certain improvements in the type of machine shown in, and this application is a continuation-in-part from, my prior co-pending application for Beet Harvesting Means and Method, Serial No. 534,414, filed May 6, 1944, now abandoned. Such machine embodies a wheel supported frame with a pair of rotating forwardly pointed lifting cones to run at opposite sides of the beet row and lift the beets from the ground, a conveyor to carry the lifted beets rearwardly, and certain forwardly located elements for opening furrows alongside the row to accommodate the following lifting cones. The primary object of my present invention is to provide improved means for engaging the beets as they are "popped" up by the cones and tipping the beets rearwardly over onto the conveyor to ensure their position delivery, and for removing any parts of the tops that may remain after the beets have been topped, and finally for slapping off and removing any clinging particles of dirt from the beets.

Another object is to provide a machine of this general type with units for harvesting two, or more, rows of beets at a time and with means between the units for preventing the accumulation of trash and dirt ahead of the machine, which heretofore has been a factor in making the use of multi-row harvesters unsatisfactory.

Another object is to provide a machine of this character with adjustments for different row spacings and all other necessary refinements to provide a practical machine for my purpose.

Still another object is to provide adjustably supported lifting cones by the use of which the forward points of the cones may be set apart to better follow the row, while permitting the use of cones of a minimum diameter to thereby reduce the amount of dirt and clods lifted along with the cones.

These and other more detailed and specific objects will be disclosed in the course of the following specification, reference being had to the accompanying drawings, in which—

Fig. 1 is a side elevation of a machine embodying my invention.

Fig. 2 is a plan view thereof.

Fig. 3 is a fragmentary enlarged sectional view along the line 3—3 in Fig. 2.

Fig. 4 is an enlarged frontal elevation of the machine.

Fig. 5 is a similar view of the rear end of the machine, and delivery conveyor being, however, in this case omitted.

Fig. 6 is an enlarged vertical cross section through the machine, along the line 6—6 in Fig. 1.

Fig. 7 is an enlarged side elevation and section of the digging and lifting elements of the machine and associated parts, substantially along the line 7—7 in Fig. 6.

Fig. 8 is a plan and sectional view illustrating a modification of the lifting cone mounting and driving assembly.

Referring now more particularly and by reference characters to the drawing, the machine of my present invention comprises a main frame designated generally at A and is here shown as constructed as a pull-behind implement, with a hitch B at its forward end for connection to a tractor. The rear end of the machine is supported by large pneumatic tired ground wheels C.

The main frame A comprises as its primary elements two transversely spaced parallel pairs of frame angles indicated at 10, 11, 12 and 13. At their forward ends the frame angles 10 and 11 are welded to the upright sides 14 of a U-shaped front frame member 15 and in the same fashion the frame angles 12 and 13 are welded to the sides 16 of a similar forward frame member 17. The frame members 15 and 17 extend upwardly from the forward ends of the frame angles and mounted against their forward sides are upper and lower cross members 18 and 19 formed of oppositely positioned angle irons rigidly connected in vertically spaced relation by upright tie bars 20. A pair of bolts 21 fastens each of the cross members 18 and 19 to the respective frame members 15 and 17 and for the accommodation of these bolts the cross members have a series of transversely spaced openings 22 which may be aligned with properly positioned openings 23 in the frame members 15 and 17. The purpose here is to permit the respective pairs of frame angles 10—11 and 12—13 to be adjusted transversely with respect to each other so that the harvesting units which are mounted between these pairs of angles may be adjusted to operate upon crops of different row spacings. Sugar beet rows are conventionally planted in rows, the spacing of which varies in increments of two inches and in accordance with my invention, the openings 22 are spaced apart this distance. The openings 23, on the other hand, while being spaced apart two inches also are staggered or offset one inch with reference to the openings 22 so that the frame angles 10—11 and 12—13 may be adjusted in one inch increments. Obviously, such adjustment is necessary in order to permit the harvesting units themselves to be moved together and apart in steps of two inches overall. The rear ends of the respective frame angles 10—11 and 12—13 are in a similar fashion welded to the upright sides 24 and 25 of rear frame members 26 and 27, respectively, and traversing the rear lower portions of these rear frame members is a rear cross bar 28 secured in place by bolts 29. Series of openings are provided at this rear end for the accommodation of the bolts 29 exactly as described above so as to permit adjustments at the rear end to correspond to those at the forward end of the machine. The sides 24 and 25 of these rear frame members 26 and 27 extend upwardly to a considerable height and are jointed at their upper ends by transversely and horizontally extending webs 30 and 31, respectively, across which is mounted an upper rear frame bar 32. At this point also a series of bolts 33 and properly spaced openings are provided to permit adjustments of one inch increments between the rear frame members and the upper cross bar 32. The rear ground wheels C are journaled by axles 34 in bearings 35 carried by the lower rear cross member 28 as shown in Figs. 4 and 5. Referring now again to the forward end of the machine the tractor hitch B is secured to the end of the tubular tongue 36 welded to and extending forwardly from the center of the lower cross member 19 and rigidly braced against horizontal or vertical displacement by braces, indicated throughout at 37. To support the forward end of the machine when disconnected from the tractor I provide a stand 38 pivoted at 39 to the forward end of the tongue 36, and which may be swung downwardly from its normal position shown in Fig. 1 to contact the ground whenever required.

Positioned in the longitudinal spaces between the respective frame angles 10—11 and 12—13 is a pair of harvesting units or assemblies for harvesting beets from adjacent crop rows and since these assemblies are identical in construction and operation only one will here be described in detail, and the corresponding parts of each will be designated by corresponding reference numerals. Each said harvesting unit comprises a sub-frame made up of two spaced side bars 40 and 41 positioned loosely between the adjacent frame angles and at their forward ends bent inwardly in converging relation and joined together in the form of a centrally located guide finger 42. The said finger 42 moves loosely up and down through a vertical guideway 43 secured to the rear side of the adjacent forward frame member 15 or 17, as the case may be, and this guideway permits upward and downward swinging movements of the sub-frames, while preventing horizontal displacement thereof. The side bars 40—41 are supported for such swinging movements by brackets 44 on their rear ends, which are pivotally attached at 45 to a countershaft 46 rotatably mounted in bearings in the sides of the respective rear frame members 26—27. This construction is best shown in Fig. 5 and it will be apparent that the arrangement permits the sub-frames made up of the side bars 40—41, and all connected parts, to be raised and lowered with respect to the main frame and the ground. For thus raising and lowering these assemblies there is provided a transversely extending tubular rock shaft 47 journaled through the sides 14—16 of the forward frame members and at its center having an upwardly extending arm 48 to which is pivoted the upper rear end of a plunger 49 of a hydraulic lift unit 50. Said lift unit is pivotally attached at its lower forward end at 51 to the tongue 36 and the arrangement is such that the selective admission of fluid to the lift will cause it to oscillate the rock shaft 47 as will be understood. Over each of the sub-frame units, and located centrally with respect to the side bars 40—41 thereof, the rock shaft 47 is provided with a rearwardly extending arm 52 which may be connected by a bolt 53 through any one of a series of openings 54 to a lift bar 55. The said lift bar is pivotally attached at its lower end 56 to a cross member 57 joining the said bars 40—41 so that the aforesaid oscillation of the rock shaft will raise and lower the forward ends of the bars. A series of openings 54 for the bolts 53 permit convenient coarse adjustment and in order to permit the adjustment of the arm 52 in transverse directions to correspond to row adjustments of the units the rock shaft 47 has a series of openings 58 into any one of which a pin 59 carried by the arm 52 may be positioned. As shown in Fig. 3 the arm 52 is carried by one-half 60 of a clamp 61 positioned around the rock shaft 47 and by releasing this clamp the pin 59 may obviously be readily adjusted into any one of the openings 58.

As here shown the machine is arranged for operation from the tractor power take-off and it is accordingly provided with a universally mounted shaft section 62 connected to the forward end of a drive shaft 63 which extends into and drives a gear box 64. Extending laterally out of the gear box 64 is a pair of drive shafts 65 and both the gear box and bearings 66 for the shaft 65 are carried upon the upper rear cross member 32 as clearly shown. Sprocket chain 67 connects the shaft 65 to the aforesaid countershafts 46 so that they are driven from the power take-off of the tractor, but it is to be understood, of course, that I may provide the machine with its own integral power plant, in which case these driving arrangements will be varied somewhat.

One of the harvesting units, per se, associated with the sub-frame assemblies just described will now be set out in detail and it comprises as its primary operating means a pair of rotary lifting elements in the form of forwardly tapered cones 68 which are mounted at the forward ends of cone drive shafts 69. Adjacent the cones these shafts 69 are journaled through bearings 60 (shown best in Fig. 5) positioned inside the lower ends of V-shaped hanger brackets 71 welded to and depending in spaced relation from the side bars 40 and 41. The bearings 70 are supported in such position by a transversely extending shaft 72 journaled at its ends through the bracket 71. From these bearings the cone drive shafts 69 angle upwardly and rearwardly and are journaled at their rear ends in gear boxes or drive units 73, the sides of which are attached to hanger arms 74 extending upwardly and secured to the rear ends of the side bars 40—41 as indicated at 75 in Fig. 5. A drive shaft 76 is journaled into the gear box or drive unit 73 and it is connected by a sprocket chain 77 to the countershaft 76 to be driven thereby. Within the unit 73 the shaft 76 is connected to the cone drive shaft 69 by any suitable drive gear mechanism (such as that shown in the Addleman Patent No. 1,211,031 of January 2nd, 1917), and in such manner as to rotate the shaft 69 in opposite directions. The cones 68 are thus so rotated that they turn in upward directions at their facing sides and there are adapted to run along opposite sides of the beet row and engage and lift the beets from the ground as is well known in the art. To facilitate this operation, the cones are also spirally ribbed as designated at 78. Furrows are opened along the sides of the beet row in advance of the cones 68 by means of plow 79 attached to the lower ends of inverted U-shaped beams 80 the horizontal bight portions 81 of which are journaled in bearings 82 depending from said bars 40—41. At their upper ends the shank arms 80 are provided with rigidly and upwardly extending levers 83 and above the level of the side bars 40—41 the upper ends of the levers are connected by links 84 to shear pins 85 in brackets 86 on the side bars. This assembly normally prevents forward and rearward displacement of the plows 79 but should they encounter an obstacle in their path the shear pins 85 may shear off and permit the plows to swing upwardly, and prevent damage. As will be noted in Fig. 7 the plows 79 have forwardly and downwardly extending points 87 extending well below the forward ends of the cones 68 and these points serve to loosen the ground deeply alongside the beets to facilitate their lifting by the cones. Also running in advance of the plow 79 are conventional coulters 88 having their shanks 89 clamped at 90 on the side bars.

The beets lifted by the cones 68 move to the rear and over upon a receiving means here shown as comprising a conveyor chain 91 having conventional conveyor lugs 92. The chain 91 operates over a sprocket 93 at its forward end which is journaled upon the aforesaid shaft 72 thus locating it centrally with respect to the space between the cones and immediately to the rear thereof. The conveyor chain 91 runs over and is driven by a sprocket 94 (Fig. 5) upon the countershaft 46 and the direction of rotation of this shaft is such that the upper flight of the chain moves in a rearward and upward direction to convey the lifted beets upwardly over the shaft and to the rear of the machine.

The beets from each of the harvesting units are delivered by the respective conveyors 91 into a hopper 95 and thence into the receiving scoop 96 of an elevator 97 by which they are delivered into a truck or wagon running alongside the machine. The precise details of this elevator and hopper arrangement are not, of course, important to my present invention but it will be noted that the elevator is swivelled at 98 upon a bracket 99 carried by the rear bar 28 and that a yoke assembly 100 attached to the upper cross bar 32 provides a support for a chain 101 by which the upper end of the elevator is supported. A rearwardly extending shaft 102 is connected to the gear box 64 in order to operate the elevator and it will be noted that stand brackets 103 and 104 are provided upon the cross members 18 and 32 and connected by tie rods 105 to stiffen the machine longitudinally. The forward stand bracket 103 also provides a support for a bearing 106 for the forward end of the shaft 63. The hopper 95 is supported from a two part frame 107 secured at its ends to the outer side portion of the rear frame members 26 and 27 and the overlapping rear ends of the frame are connected by a clamp 108 so that adjustments may be made to correspond to the row crop adjustments of the harvesting units as previously described.

As the beets are lifted by the cones they are engaged by a reel member designated generally at 109 which has a hub assembly 110 secured upon a shaft 111 carried by the lower ends of swingable support arms 112. An inverted U-shaped bracket 113 is secured to the side bars 40—41 by means of bolts 114 and a drive shaft 115 is journaled through the upper end of the bracket and pivotally supports the arms 112 for forward and rearward movements at their lower ends. A drive pulley 116 is mounted at the inner end of the shaft 115, as seen in Fig. 6, and a belt 117 runs from this pulley rearwardly over a pulley 118 upon the inner end of the countershaft 46. Another pulley 119 is mounted upon the shaft 115 and is connected by a belt 120 to a pulley 121 upon the inner end of the shaft 111 to rotate the hub assembly 110. This hub assembly, and the reel as a whole, must for proper operation rotate rearwardly at its underside, or clockwise as viewed in Fig. 7, and in order to provide this direction of rotation at the shaft 111 the belt 117 is twisted as shown in Fig. 1.

The hub assembly 110 actually comprises, as in Figs. 4 and 6, three separate hubs secured to the shaft 111 in transversely spaced relation and to each of these hubs there are secured three beet engaging elements or arms designated generally at 122. These arms are of flexible construction and are made up of several plies of flexible strap material, with the plies varying in length so that the elements diminish in effective thickness toward their outer ends. The inner ends of these elements 122 are secured, as by means of bolts or rivets 123, to the hubs 110 so that in their normal position the elements extend not radially but tangentially with respect to a circle centered about the axis upon which the reel rotates. Attention is called to the fact that, as shown in Fig. 7 particularly, the arms or beet engaging elements 122 of the outer two rows operate and are positioned in advance of the corresponding elements of the center row, this being readily effected by adjustment of the sections of the hub 110 angularly with respect to each other, upon their shaft 111.

In operation this reel member 109 is rotated at a speed such that the flexible ends of the arms or elements 122 will strike the beets as they are lifted from the ground by the cones and will tip the beets rearwardly, driving them over onto the delivery conveyor 91, with a slapping action. Not only does this slapping action of the arms or elements 122 assist in delivery of the beets to the conveyor 91 but it also has the very desirable function of knocking off any dirt which may be clinging to the beets, and removing any leaves which may have been left on the beets by the topping operation which usually precedes the harvesting. Inasmuch as the center row of arms 122 lags behind the two outer rows thereof, the arms at the sides of the reel will contact the beets first and counteract any tendency of the beets to fall off to either side, and in practice it is found that this arrangement of the arms very effectively centers and delivers the beets directly onto the conveyor 91. The center arms 122 in particular will strike what has been the forward sides of the beets in the ground and inasmuch as the forward travel of the cones 68 has a tendency to drag the beets both forwardly and upwardly in lifting them it is to this forward side of the beet that the dirt is most likely to cling. The slapping action of the center arms 122 is thus best calculated to remove this dirt, to the end that the beets as delivered from the machine will be as clean as possible with mechanical harvesting.

The bolts 114 may be placed in any one of a series of openings 124 in the bracket 113 in order to adjust the reel member 109 upwardly and downwardly. It is also desirable to provide forward and rearward adjustment of each reel member and for this purpose I mount a hand lever 125 upon the shaft 115 which supports the reel, and provide a quadrant upon the upper end of the bracket 113. The usual latch is provided on the hand lever 125 for locking it in any angular position upon the quadrant 126 and such adjustment of the lever will obviously swing the arms 112 forwardly and rearwardly to correspondingly position the reel.

In the operation of a two-row harvester of this type, it is imperative that some means be provided to prevent the accumulation of trash and dirt ahead of the harvester units. In accordance with my invention, I provide an endless chain 127 which is supported upon a forward sprocket 128 and rear sprocket 129 to run forwardly and rearwardly at the center of the machine. The forward end of the chain 127 is supported in hanger arms 130 depending from the rear frame member 28 while the rear end is supported upon a drive shaft 131 which itself is mounted in bearing brackets 132 upon one of the drive units 73 for the cones. A gear 133 upon the shaft 132 meshes with a gear 134 on the drive shaft 76 of the same drive unit and the chain 127 is thus power operated so that its lower flight runs in a rearward direction as indicated in Fig. 1. Lugs 135 are provided upon the chain 127 and it is driven at such speed that it will run in a rearward direction at about the ground speed of the machine and thus "walk over" and hold down trash between the rows. This is found to completely overcome any tendency for trashy material to progressively accumulate ahead of the harvesting units and interfere with their normal operation.

In Fig. 8 I show a modification of the lifting elements for my machine but employing the same cones 68 and driveshaft 69. In this case, however, the axes of the cones diverge in a forward direction so that their points 136 are spaced relatively wide apart making it easier for the operator of the machine to properly follow the beet rows and be sure that all of the beets enter between the cones. It may be pointed out, at this point, that the same effect cannot be practicably obtained by using cones of larger diameter since the larger cones pick up more dirt along the beets. This is a proven fact and cones of five or six inches in diameter are about as large as can be successfully employed. By arranging the cones on divergent axes, I am enabled, however, to secure a noticeable widening of the distances between their points 136 without the necessity for increasing their diameter beyond that found best suited for the work. As shown, the rear ends of the cone driveshaft 69 as extending into a drive unit housing 137 through self-aligning bearings 138 and connected inwardly of the housing 137 by gears 139. One shaft 69 may emerge through an opening 140 in the rear of the housing 137 for drive through a sprocket or pulley indicated at 141. This arrangement is, of course, shown for example only and to set out one method in which cones arranged upon the diverging axes may be driven.

It is understood that suitable modifications may be made in the structure as disclosed, provided such modifications come within the spirit and scope of the appended claims. Having now, therefore, fully illustrated and described my invention, what I claim to be new and desire to protect by Letters Patent is:

1. In an apparatus for harvesting beets from the row, the combination with a frame, a pair of spaced beet lifts supported on the frame for travel along opposite sides of the row and operative to lift the beets from the ground, and means rearwardly of the lifter to receive the beets, of a rotary reel member operatively supported on the frame and rotatable rearwardly at its underside between and over the lifters, power means for rotating the reel member, and the said reel member including a hub and a plurality of arms secured at inner ends thereto, the said arms each being made of a plurality of plies of narrow flexible strip material and diminishing in thickness outwardly.

2. In an apparatus for harvesting beets from the row, the combination with a frame, a pair of spaced beet lifters supported on the frame for travel along opposite sides of the row and operative to lift the beets from the ground, and means rearwardly of the lifter to receive the beets, of a rotary reel member operatively supported on the frame and rotatable rearwardly at its underside between and over the lifters, power means for rotating the reel member, the reel member including a rotary hub and plurality of arms secured at inner ends thereto and extending outwardly therefrom, the said arms each comprising a plurality of plies of graduated lengths and of flexible strap material.

3. In an apparatus for harvesting beets from the row, the combination with a frame, a pair of spaced beet lifters supported on the frame for travel along opposite sides of the row and operative to lift the beets from the ground, and means rearwardly of the lifter to receive the beets, of a rotary reel member and drive mechanism for rotating the member rearwardly at its underside over the lifters to engage and slap the beets over onto said receiving means, a support on the frame for the reel member, and means for manually adjusting the support to move the reel member forwardly and rearwardly with respect to the lifters.

JOHN A. DIETHELM.

REFERENCES CITED

The following references are of record in the file of this patent:

UNITED STATES PATENTS

| Number | Name | Date |
| --- | --- | --- |
| 919,342 | Gettelmann | Apr. 27, 1909 |
| 1,211,030 | Addleman | Jan. 2, 1917 |
| 1,273,757 | Fanger | July 23, 1918 |
| 1,806,974 | Irvine | May 26, 1931 |
| 1,994,818 | Hargens | Mar. 19, 1935 |
| 2,452,418 | Zuckerman | Oct. 26, 1948 |

FOREIGN PATENTS

| Number | Country | Date |
| --- | --- | --- |
| 39,082 | Austria | Oct. 11, 1909 |
| 519,184 | Great Britain | Mar. 19, 1940 |